Aug. 23, 1966  D. L. PAINE  3,267,747
CONTROL APPARATUS
Filed May 4, 1964
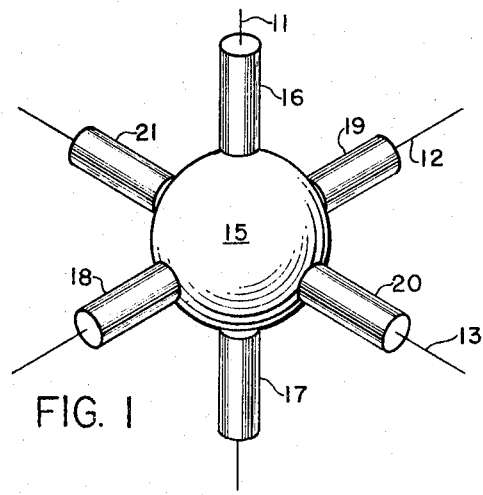
FIG. 1
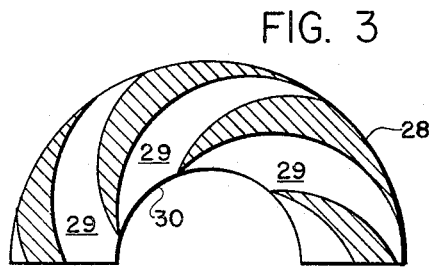
FIG. 3
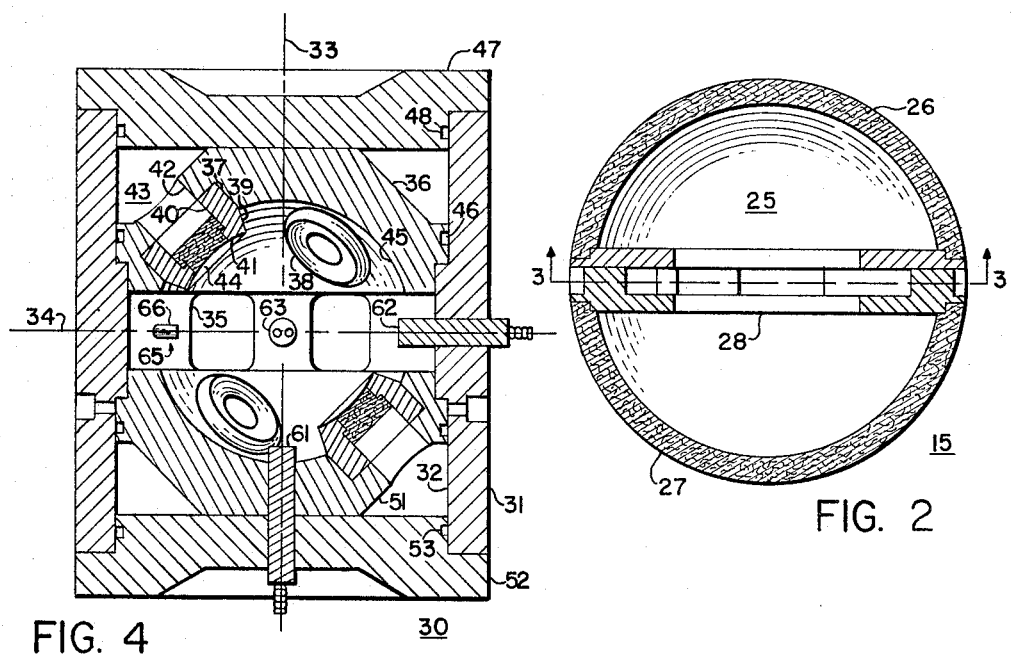
FIG. 4
FIG. 2
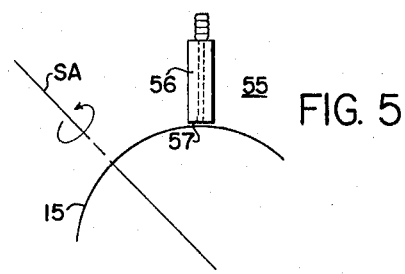
FIG. 5
INVENTOR.
DAVID L. PAINE
BY Charles J. Ungemach
ATTORNEY Patented August 23, 1966

3,267,747
CONTROL APPARATUS
David L. Paine, Bloomington, Minn., assignor to Honeywell Inc., Minneapolis, Minn., a corporation of Delaware
Filed May 4, 1964, Ser. No. 364,627
5 Claims. (Cl. 74—5.7)

This invention pertains to gyroscopes, and more particularly to attitude gyroscopes.

The applicant has provided a unique two axis attitude reference gyro untilizing a fluid supported and driven porous rotor as a reference element. A plurality of drive nozzles are tangentially positioned around the equator of the hollow spherical porous rotor. The rotor is supported by six hydrostatic bearing pads disposed along three orthogonal axes. This support mechanism provides the rotor with full angular freedom about all three orthogonal axes. A portion of the fluid flowing through the bearing pads also flows through the walls of the porous rotor into a cavity therein. The fluid within the cavity of the rotor exhausts therefrom through the drive nozzles thereby rotating the rotor at a substantially constant velocity. Pickoff means are provided to generate an output signal indicative of the position of the rotor relative to the three orthogonal axes. Thus the applicant has provided a unique full angular freedom, two axis attitude gyro utilizing a porous rotor wherein a fluid simultaneously supports the rotor and drives the rotor without introducing serious precession torque.

The applicant's invention will become more apparent from a study of the accompanying specification and claims in conjunction with the drawings, in which:

FIGURE 1 is a schematic representation of the support means;

FIGURE 2 is a cross-sectional view of the rotor;

FIGURE 3 is a partial cross-sectional view taken along line 3—3 of FIGURE 2;

FIGURE 4 is a cross-sectional view of the housing means; and

FIGURE 5 is a pictorial representation of the applicant's pickoff means.

Referring now to FIGURE 1, three orthogonal axes are identified by reference numerals 11, 12, and 13. A reference element or rotor 15 is positioned at the origin of the three orthogonal axes 11, 12, 13. A first pair of hydrostatic bearing pads 16, 17 are positioned upon axis 11 on opposite sides of rotor 15 and in opposed relationship. Bearing pads 16 and 17 function to support rotor 15 along axis 11. A second pair of bearing pads 18, 19 is positioned upon axis 12 on opposite sides of rotor 15 and in opposed relationship. Bearing pads 18, 19 function to support rotor 15 along axis 12. A third pair of hydrostatic bearing pads 20, 21 are provided upon axis 13 on opposite sides of rotor 15 and in opposed relationship. Bearing pads 20, 21 function to support rotor 15 along axis 13. Thus rotor 15 is hydrostatically supported by six bearing pads 16 through 21 positioned along three orthogonal axes. The six bearing pad configuration is necessary in order to eliminate precession torque due to the supporting mechanism. Calculation and experimentation has shown various other bearing pad configuration results in a serious precession torque acting upon the rotor 15. Such a precession torque results in large drift rates which are generally unacceptable for long term operation of the attitude gyro.

FIGURE 2 is a cross-sectional view of rotor 15. Rotor 15 has a spherical cavity 25 therein. Rotor 15 comprises a first porous hemispherical portion 26, a second porous hemispherical portion 27, and an annular drive nozzle assembly 28. Hemispherical portions 26 and 27 are fabricated from a porous metallic material, such as sintered stainless steel. The thickness of the walls of the hemispherical portions 26 and 27 is thin relative to the radius of the rotor 15. Annular drive nozzle assembly 28 is best illustrated in FIGURE 3. A plurality of fluid passages 29 are provided within drive nozzle assembly 28. One end of each of fluid passages 29 is in communication with a central opening 30 in drive nozzle assembly 28. When assembled into rotor 15, opening 30 forms part of cavity 25 so that passages 29 are in communication with cavity 25. Fluid passages 29 are curved outwardly so as to intersect with the outer surface of drive nozzle assembly 28 in a tangential relationship. Stated otherwise, fluid flowing from central opening 30 (cavxity 25) through fluid passage 29 will exhaust from drive nozzle assembly 28 in a direction tangent to the outer surface thereof. Hemispherical portions 26 and 27 are positioned on either side of drive assembly 28 and rigidly attached thereto by suitable mans (not shown) so as to form spherical rotor element 15.

FIGURE 4 discloses a housing means 30. Housing means 30 includes a cylindrical element 31 having a cylindrical bore 32 therethrough. The axis of bore 32 is identified by reference numeral 33. The axial midpoint of element 31 lies on an axis 34 which is perpendicular to axis 33 and lies in the plane of FIGURE 4. Element 31 has a plurality of apertures 35 therethrough which are angularly spaced about axis 33 and lie in a plane perpendicular to axis 33 and including axis 34. Apertures 35 function as exhaust ports for housing means 30.

A first bearing pad assembly 36 is positioned within bore 32 of element 31. One end of assembly 36 has a spherical surface 45 thereon which faces inwardly in bore 32. An O-ring 46 is provided between bearing pad assembly 36 and element 31 to provide a seal therebetween. Bearing pad assembly 36 includes three bearing pads, two of which are illustrated in FIGURE 4 and identified by reference numerals 37 and 38. Referring now to bearing pad 37, it comprises a cylindrical element 39 having a bore 40 therethrough. One end of element 39 is shaped as a segment of sphere having a radius substantially equal to the radius of rotor 15 and identified by reference numeral 41. The other end of element 39 is positioned within a recess in bearing paid assembly 36 so that bore 40 is aligned with a passage 42 in bearing pad assembly. Passage 42 in bearing pad assembly 36 leads to a manifold 43 which is adapted to be connected to a high pressure fluid source (not shown). A porous core 44 is inserted within bore 40 of bearing pad 37 and functions as a restrictor so as to distribute the maximum pad pressure over a relatively large area. Bearing pad 38 is identical in structure to bearing pad 37 and need not be described in detail. Bearing pad 38 lies upon an axis which is perpendicular to the axis of bearing pad 37.

An end cap 47 closes one end of bore 32 in element 31 and is rigidly attached to element 31 by suitable means (not shown). An O-ring 48 is provided to insure a seal between element 31 and end cap 47.

A second bearing pad assembly 51 is provided within bore 32. Bearing pad assembly 51 is positioned in opposed relationship with bearing pad assembly 36 so as to define a substantially spherical opening therebetween for receiving rotor element 15. Bearing pad assembly 36 and 51 provide three pair of bearing pads along three orthogonal axes. Bearing pad assembly 51 is identical to bearing pad assembly 36 and need not be described in detail. An end cap 52 closes the other end of bore 32 and is rigidly attached to element 31 by suitable means (not shown). An O-ring 53 provides a seal between end cap 52 and element 31.

A typical pickoff means is illustrated in FIGURE 5 and identified by reference numeral 55. Pickoff means 55 is more completely described in copending application Serial No. 352,269, filed in the name of Donald J. Erickson, and assigned to the same assignee as the present application. Very briefly, pickoff means 55 comprises a cylindrical element 56 having flat surface 57 on one end thereof. Two fluid passages are provided within cylindrical element 56 and intersect with flat surface 57 so as to form two orifices (not shown). A rotating body of revolution, such as rotor 15, is schematically illustrated as rotating about the spin axis SA. When flat surface 57 is positioned tangent to and contiguous with the surface of a rotating body of revolution a pressure differential is developed between the two orifices due to hydrodynamic pumping action. The pressure differential existing at the two orifices is a function of the peripheral velocity of the rotating body of revolution.

Three such pickoff means 61, 62 and 63 are utilized in housing means 30. Pickoff means 61 is positioned along axis 33, pickoff means 62 is positioned along axis 34, and pickoff means 63 is positioned along an axis perpendicular to axis 33 and 34. The pickoff means 61, 62, 63 are positioned so the flat surfaces thereof will be tangent to and contiguous with rotor 15. Since the peripheral velocity of a sphere is proportional to cosine $\theta$ where $\theta$ is referenced from the equator to the position of the pickoff means, this type of pickoff can provide direct cosine information for utilization in pneumatic navigation and guidance computers. Of course, other pickoff means may be utilized in the applicant's attitude gyro.

A caging means 65 is provided within housing means 30. Caging means 65 comprises a fluid nozzle 66 directed along parallel to axis 34 but spaced apart therefrom. Nozzle 66 is adapted to be connected to a high pressure fluid source.

In operation, each of the bearing pads is connected to a high pressure source of fluid (not shown). The path of the fluid from the fluid source to the rotor is identical in each of the six bearing pads, however, it will be explained with reference to bearing pad 37. The fluid flows from the fluid source into manifold 43 in housing means 30, through passage 42 in bearing assembly 36, through bore 40 in bearing pad means 37, through porous core 44 in bearing pad 37, and exhausts into the spherical opening within the housing means 30. Porous core 44 distributes the maximum pad pressure over a relatively large area, that is, over the area of surface 41. This produces an overall pad pressure profile similar to a pocket type of pad. Flow through the other five bearing pads is identical to pad 37 just described.

It is important to note that the six pad configuration illustrated substantially eliminates serious precession torques. This fact can be more easily understood when explained with reference to a two bearing pad configuration. The most serious error producing torque in a two bearing pad configuration is misalignment of the drag torque vector relative to the rotor spin axis. The drag torque is defined as the torque produced by the viscous coupling between the bearing pads and the rotor element. The drag torque vector is merely the vectorial representation of the drag torque utilizing the convention right hand rule. When the drag torque vector is not aligned with the spin axis, a drag torque is applied to the rotor about an axis which is inclined with respect to the spin axis. This drag torque vector can be resolved into a component parallel to the spin axis and a component perpendicular to the spin axis. The drag torque vector component parallel to the spin axis does not cause any precession of the rotor, since the drag torque is applied about the spin axis. However, the component of the drag torque vector perpendicular to the spin axis, causes the rotor to precess about an axis perpendicular to the applied torque and the spin axis, thereby causing an error in the attitude reference. In a two pad bearing configuration, the magnitude of the misalignment of the drag torque vector with the spin axis is a function of the alignment of the rotor relative to the bearings. More specifically, in a two pad configuration, the axis defined by the two opposed bearing pads and the spin axis of the gyro must coincide to eliminate any precession torque. As soon as the rotor axis is displaced from this orientation, serious precession torque arise. When utilizing a six bearing pad configuration oriented along three orthogonal axes, the drag torque vector misalignment is substantially zero for all positions of the rotor spin axis relative to the bearings. The same effect can be accomplished by utilizing four bearing pads tetrahedrally positioned relative to rotor 15. That is, the axis of each bearing pad defines tetrahedral coordinates. Any multiple of four or six pad configuration may be utilized. Thus the applicant does not wish to be limited to the six pad configuration illustrated.

The high pressure deveoped by the bearing pads is sufficient to hydrostatically support rotor 15 with no contact between the bearing pads and the rotor 15. Since rotor 15 is fabricated from a porous material, a large portion of the fluid flowing from each bearing pad is forced through the wall 26 of rotor 15 into cavity 25. The fluid in cavity 25 is then exhausted through the low impedance path provided by drive nozzles 29. The bearing design shown in FIGURE 4 will allow drive nozzles 29 on rotor 15 to pass through the bearing pad area without collapsing the bearing support. This fact provides complete angular freedom for rotor 15. Thus the applicant has provided an attitude reference gyro wherein the fluid bearings provide continuous drive energy to the free rotor without limiting the rotor's angular freedom and without causing serious precession torques.

The high pressure fluid within cavity 25 exhausts through drive nozzles 29. It is clear from FIGURE 3, that the fluid exhausting from cavity 25 exhausts tangentially. The tangential exhaust of the high pressure fluid from rotor 15 drives it at a substantially constant angular velocity about a spin axis. This spin axis will remain fixed with reference to inertial space regardless of the orientation of housing means 30. In order to establish the position of the rotor 15 relative to housing 30 (or relative to axes 33, 34) three pickoff means 61, 62, and 63 are utilized. Pickoff means 61, 62, 63 sense the peripheral velocity of the rotor 15 and provide a pressure differential signal indicative thereof. Since the peripheral velocity of a point on the sphere is proportional to the cosine of the angle defined between the point on the surface and the equator of the sphere, it is possible to utilize this type of pickoff to provide direct cosine information for the navigation and guidance computers.

Caging means 65 functions by directing a high velocity stream of fluid through nozzle 66 so as to impinge upon rotor 15 and exert a torque thereon. The torque exerted upon rotor 15 causes it to precess to a position substantially aligned with axis 33.

Thus the applicant has provided a unique attitude reference gyro having full angular freedom about two axes and utilizing a porous rotor wherein a fluid simultaneously supports the rotor and drives the rotor. Pickoff means are provided to sense the position of the porous rotor element relative to the housing means so as to provide attitude information.

Although the invention has been described and illustrated in detail, it is to be clearly understood that the same is by way of illustration and example only, and is not to be taken by way of limitation, the scope of this invention being limited only by the terms of the appended claims.

I claim:
1. An attitude gyro comprising:
 housing means having an opening therein;
 a porous spherical rotor positioned within said opening, said rotor having a cavity therein and a plu- rality of drive nozzles tangentially positioned along the equator thereof;

fluid bearing means positioned within said housing, said bearing means including a pair of bearing pads positioned in opposed relationship upon each of three orthogonal axes, said bearing means being adapted to be connected to a high pressure fluid source whereby a fluid flows from said fluid source through said bearing pads so as to hydrostatically support said rotor within said opening, said rotor thereby having full angular freedom about the three orthogonal axes, a portion of the fluid flowing from said bearing pads through said porous rotor into said cavity therein, the fluid within said cavity exhausting therefrom through said drive nozzles thereby rotating said rotor at a substantially constant velocity;

pickoff means positioned within said housing, said pickoff means providing an output signal indicative of the position of said rotor relative to the three orthogonal axes; and fluid caging means, said caging means being operable to maintain said rotor in a fixed orientation.

2. An attitude gyro comprising:

housing means having an opening therein;

a porous spherical rotor positioned within said opening, said rotor having a cavity therein and a plurality of drive nozzles tangentially positioned along the equator thereof;

fluid bearing means including four bearing pads tetrahedrally positioned within said housing means, the axes of said bearing pads defining tetrahedral coordinates, said bearing means being adapted to be connected to a high pressure fluid source whereby a fluid flows from said fluid source through said bearing so as to hydrostatically support said rotor within said opening, said rotor thereby having full angular freedom about the four axes, a portion of the fluid flowing from said bearing pads through said porous rotor into said cavity therein, the fluid within said cavity exhausting therefrom through said drive nozzles thereby rotating said rotor at a substantially constant velocity; and pickoff means positioned within said housing, said pickoff means providing an output signal indicative of the position of said rotor relative to the four axes.

3. An attitude gyro comprising:

a porous spherical rotor having a cavity therein and a plurality of drive nozzles tangentially positioned along the equator thereof;

fluid bearing means including a pair of bearing pads positioned in opposed relationship upon each of three orthogonal axes, said bearing means being adapted to be connected to a high pressure fluid source whereby a fluid flows from said fluid source through said bearing pads so as to hydrostatically support said rotor, said rotor thereby having full angular freedom about the three orthogonal axes, a portion of the fluid flowing from said bearing pads through said porous rotor into said cavity therein, the fluid within said cavity exhausting therefrom through said drive nozzles thereby rotating said rotor at a substantially constant velocity; and pickoff means providing an output signal indicative of the position of said rotor relative to the three orthogonal axes.

4. An attitude gyro comprising:

a porous spherical rotor having a cavity therein, said rotor having a plurality of drive nozzles in communication with said cavity, said drive nozzles being positioned along the equator of said rotor;

hydrostatic bearing means including a pair of bearing pads positioned in opposed relationship upon each of three orthogonal axes, said bearing means being adapted to be connected to a high pressure fluid source whereby a fluid flows from said fluid source through said bearing pads, through said rotor into said cavity, and exhausts from said cavity through said drive nozzles, the fluid thereby simultaneously supporting said rotor and rotating said rotor at a substantially constant velocity; and pickoff means providing an output signal indicative of the position of said rotor relative of the position of said rotor relative to the three orthogonal axes.

5. An attitude gyro comprising:

a porous spherical rotor having a cavity therein, said rotor having a plurality of drive nozzles tangentially positioned along the equator thereof, said drive nozzles being in communication with said cavity;

hydrostatic bearing means including a plurality of bearing pads, said bearing means being adapted to be connected to a high pressure fluid source whereby a fluid flows from said fluid source through said bearing pads, through said rotor into said cavity, and exhausts through said drive nozzles so as to simultaneously support said rotor and to rotate the rotor at a substantially constant velocity, said rotor thereby having full angular freedom in all directions relative to said bearing pads; and pickoff means for providing an output signal indicative of the position of said rotor.

References Cited by the Examiner

UNITED STATES PATENTS

| | | | |
|---|---|---|---|
| 2,688,805 | 9/1954 | Annen | 75—5.7 X |
| 2,729,106 | 1/1956 | Mathiesen | 74—5.7 |
| 2,940,318 | 6/1960 | Adams et al. | 74—5 |
| 2,976,736 | 3/1961 | Cook | 74—5.6 |

FRED C. MATTERN, Jr., *Primary Examiner.*

J. D. PUFFER, *Assistant Examiner.*